United States Patent
Asselman et al.

[11] Patent Number: 5,969,511
[45] Date of Patent: Oct. 19, 1999

[54] METHOD AND DEVICE FOR CONTINUOUS ADJUSTMENT AND REGULATION OF TRANSFORMER TURNS RATIO, AND TRANSFORMER PROVIDED WITH SUCH DEVICE

[75] Inventors: Paulus G. J. M. Asselman, Leidschendam; Jan Hendrik Griffioen, Pijnacker; Pavol Bauer, Delft; Gerardus Chr. Paap, Capelle aan de IJssel; Sjoerd W. H. de Haan, Delft; Cornelis J. van de Water, Duiven, all of Netherlands

[73] Assignee: N.V. Eneco, Rotterdam, Netherlands

[21] Appl. No.: 09/016,243

[22] Filed: Jan. 30, 1998

Related U.S. Application Data

[63] Continuation of application No. PCT/NL96/00304, Jul. 26, 1996.

[30] Foreign Application Priority Data

Aug. 1, 1995 [NL] Netherlands ............... 10001914

[51] Int. Cl.⁶ .................................................. G05F 1/16
[52] U.S. Cl. ..................................... 323/258; 323/343
[58] Field of Search ................................. 323/209, 255, 323/257, 258, 340, 343

[56] References Cited

U.S. PATENT DOCUMENTS

| | | |
|---|---|---|
| 4,562,338 | 12/1985 | Okami . |
| 5,075,617 | 12/1991 | Farr . |
| 5,155,672 | 10/1992 | Brown . |
| 5,166,597 | 11/1992 | Larsen et al. . |
| 5,289,110 | 2/1994 | Slevinsky . |
| 5,786,684 | 7/1998 | Bapat ...................................... 323/258 |
| 5,808,454 | 9/1998 | Chung ..................................... 323/255 |
| 5,821,739 | 10/1998 | Imoto ..................................... 323/258 |

FOREIGN PATENT DOCUMENTS

WO24622 10/1994 WIPO .

*Primary Examiner*—Adolf Deneke Berhane
*Attorney, Agent, or Firm*—Jones, Day, Reavis & Pogue

[57] ABSTRACT

In a method and a device for continuously adjusting, within a certain adjustment range, the turns ratio between the primary winding and the secondary winding of a power transformer provided with at least one regulating winding, a first tap is switched on during a portion of a cycle of the alternating voltage of the transformer and a second tap is switched on during another portion of the cycle of the alternating voltage. For this purpose, the device comprises electronic switches in the form of thyristors or transistors.

17 Claims, 4 Drawing Sheets

Fig. 2

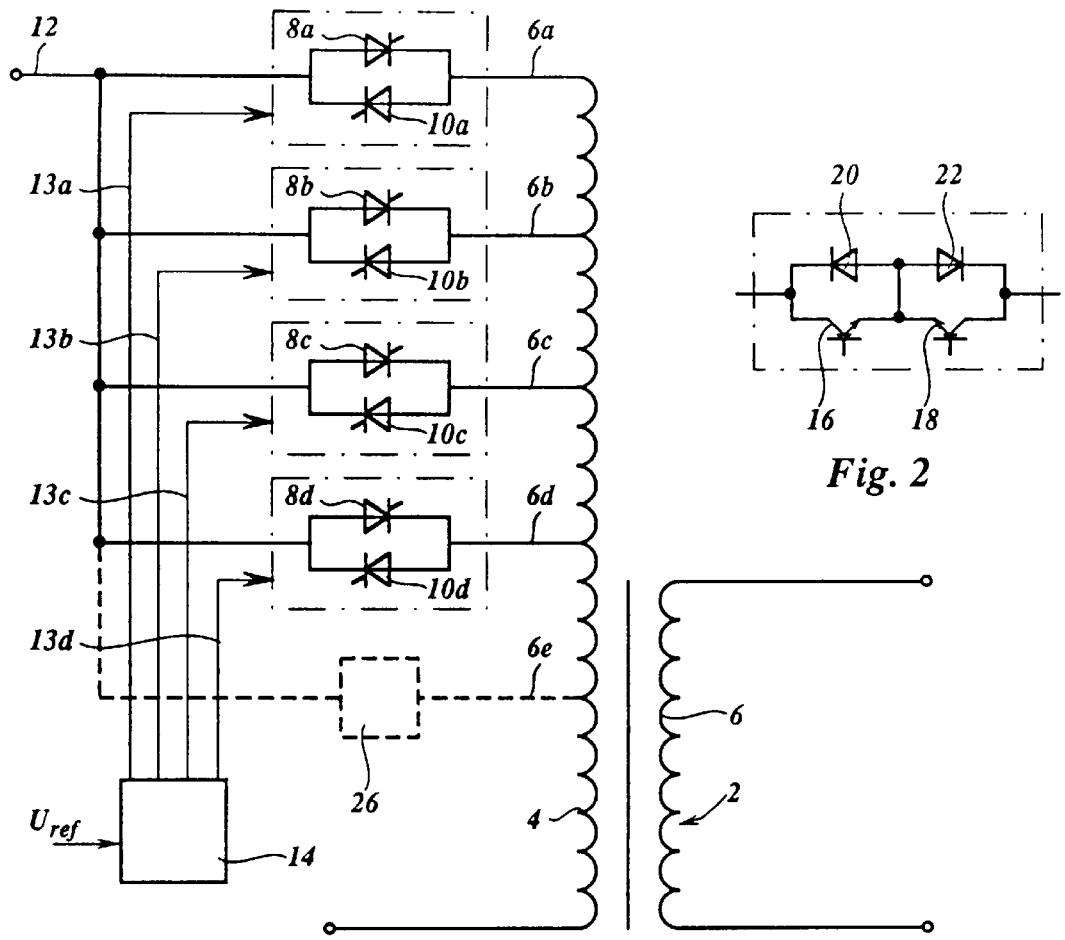
*Fig. 1*
*Fig. 2*
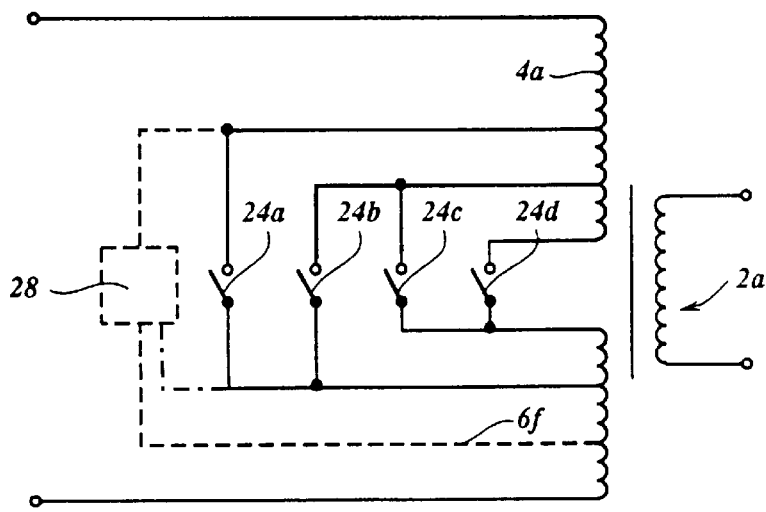
*Fig. 3*

METHOD AND DEVICE FOR CONTINUOUS ADJUSTMENT AND REGULATION OF TRANSFORMER TURNS RATIO, AND TRANSFORMER PROVIDED WITH SUCH DEVICE

BACKGROUND OF THE INVENTION

This is a continuation application of copending International patent application Ser. No. PCT/NL96/00304, filed Jul. 29, 1996, designating the United States.

The invention relates to a method and a device for adjusting, within a certain adjustment range, the turns ratio between the primary and the secondary winding of a power transformer having at least one regulating winding provided with taps.

In networks for the distribution of electrical power, use is made of network parts having different voltage levels which are generally mutually coupled by means of transformers whose turns ratio between the voltage at the primary side and the voltage at the secondary side can be regulated or is adjustable in steps within certain limits as a result of equipping at least one of the windings of the transformer with taps which can be selected by means of a switching device.

Depending on the desired transformer application, this may involve regulation or adjustment of the turns ratio in one or more steps under load by means of on-load tap-changers or a semipermanent adjustment of the turns ratio in one or more steps in the switched-off state of the transformer by means of tap selectors. Regulation or adjustment of the turns ratio of the transformers in the distribution network is necessary to be able to guarantee a certain voltage level within fixed limits in the case of divergent load situations both of a short-term and a long-term nature at the distribution points associated with the consumers of the electrical power.

From measurements and calculations it has been found that, with the present transformer regulating and adjusting facilities, the voltage variation in urban networks is approximately 7% of the rated voltage, while in rural networks there is a voltage variation of approximately 14%. In addition, the average voltage over all the distribution points is found to be 2% to 4% higher than the rated value. As a result, unnecessary losses occur in the transformers, and the consumers have on average an unduly high consumption.

Viewed from the generating end to the distribution end, the cause of the voltage variation in the distribution networks is the cumulative effects of voltage losses over the medium-voltage network, the low-voltage transformer and the low-voltage network, in which connection the stepped regulation of the medium-voltage transformer and a current influencing system which cannot be accurately adjusted play a part. In addition, unequally loaded cable phases or decentralized energy generation give rise to voltage differences in the network.

SUMMARY OF THE INVENTION

The object of the invention is to provide, in a simple and cheap manner, in the first place, a method of the type mentioned in the preamble, with which method the adjustment of the voltage in the distribution networks can take place appreciably more accurately and rapidly than in the prior art and, in addition, under load. For this purpose, the method according to the invention is characterized in that, to obtain a transformer turns ratio which is essentially continuously adjustable within the adjustment range, a first tap is switched on during a portion of a cycle of the alternating voltage of the transformer and a second tap is switched on during another portion of a cycle of the alternating voltage. Thus, during one cycle of the alternating voltage, two taps are separately in operation and the current flows through one of the taps in accordance with the times for which the respective taps are switched on. It should be pointed out that said times of switching-on may also be (virtually) equal to zero.

With the improved voltage regulating facilities under load which are obtained as a result of this method, the turns ratio of a transformer provided with taps can be adjusted accurately and very rapidly in such a way that the rated voltage approximately prevails, particularly at the distribution points of the distribution network. As a result, the transformers will be capable of being operated without increased voltage compared with the regulating facilities hitherto usual; this therefore results in an average voltage reduction of 2% to 4% compared with the present situation. The zero-load losses of a transformer will consequently be approximately 5% to 9.5% lower, depending on the voltage-dependence of the zero-load losses of the transformer.

At the distribution point of the electrical power, the voltage reduction results in an energy saving which, on the basis of measurements in a Dutch distribution network and of the EPRI Report EL-3591 entitled "The Effects of Reduced Voltage on the Operation and Efficiency of Electric Systems", Volume 1, Project 1419-1, Jun. 1984, is approximately 1.8% for 2% average voltage reduction, and approximately 3.6% for 4% average voltage reduction. Appreciable savings are therefore to be achieved both for the operator of the distribution network of which the transformers form part and for the consumers of the electrical power.

In addition, the deviations from the rated voltage over an arbitrary period of time decrease.

Furthermore, large indirect savings are possible for the distribution company in management and in the network configuration of the medium-voltage and low-voltage network.

With regard to voltage regulation in stations, voltage problems in networks can be solved and managed with differently loaded medium-voltage phases.

With regard to network configuration, it is found that medium-voltage networks can be operated over a much greater distance because transformer power supply can take place independent from the voltage drop of the medium voltage part of the network. As a result, savings are possible on network configurations at voltage levels of 150 kV, 50 kV, 25 kV and 10 kV.

Cable cross sections can also be reduced since the voltage drop is no longer critical as a design criterion for the network; only the transport capacity is then still a design criterion.

In connection with the feedback of energy, savings can be achieved in that separate transformers are no longer necessary for supplying and receiving power since the voltage can be regulated with the method according to the invention regardless of the direction of the power.

Finally it should be pointed out that, in the case of parallel operation of transformers, power distribution can be adjusted very well by the voltage regulation regardless of a difference in the short-circuit impedance of the transformers working in parallel.

Preferably, the switching between the first and second tap in the method according to the invention takes place in pulse-width modulation. As a result, a good compensation for harmonic voltages can be obtained. The harmonic currents and voltages generated have frequencies which are exclusively odd multiples of the basic frequency (usually: 50 or 60 Hz). If the frequency of the pulse width modulation is at least an order of magnitude higher than the frequency of the alternating voltage or of the harmonic voltage or current to be compensated for, a corrected voltage or current is obtained whose fundamental frequency is equal to the basic frequency of the alternating voltage. In addition, as a result of varying the pulse width, a voltage is obtained which can be easily regulated and whose value is essentially proportional to the ratio of the time periods for which the first and second taps are switched on.

In another preferred embodiment, the switching between the first and second tap in the method according to the invention takes place with the aid of phase control, i.e. the switching-on of a tap at a particular phase angle, also termed phase-angle control. The voltage level of the regulating winding varies with the choice of phase angle. If unidirectionally conducting switches are used, the switching-off of a phase takes place by natural commutation at the instant the current passes through zero.

The next object of the invention is to provide a device of the type mentioned in the introduction for achieving the abovementioned objects. For this purpose, said device is characterized by: a number of electronic switches which are provided with a first and a second terminal, and which can be made to conduct unidirectionally or bidirectionally with the aid of control signals, the first terminals being each adapted to be connected to a tap of the regulating winding and whose second terminals are adapted to be connected to the first or the second terminal of at least one other switch; and a control device for supplying the control signals to the switches in such a way that, to obtain a transformer turns ratio which is essentially continuously adjustable within the adjustment range, a first tap is switched on during a portion of a cycle of the alternating voltage of the transformer and a second tap is switched on during another portion of the cycle of the alternating voltage, the ratio of the time periods in which the first and second taps are switched on being dependent on the value of a transformer turns-ratio control signal fed to the control device. Such a switching device replaces the conventional, mechanically operated onload tap-changer or tap selector and enables the operator of the associated transformer to adjust the transformer turns ratio rapidly, accurately and essentially continuously.

With the method and the switching device according to the invention, a number of novel control facilities have come within reach, such as:

compensation for harmonic voltages. Assuming that the regulating winding of the transformer is on the primary side, the switching device according to the invention can be controlled in such a way that a harmonic voltage distortion on the primary side is not present on the secondary side, with the result that the secondary voltage has essentially a sinusoidal shape;

compensation for harmonic currents. Assuming, again, that the regulating winding of the transformer is on the primary side, a switching device according to the invention can be controlled in such a way that, using one or more capacitors, harmonic currents on the primary side can be compensated for, and this results in an essentially sinusoidal primary network current. It should be pointed out that the compensation for harmonic currents cannot take place simultaneously with the compensation for harmonic voltages;

correction for asymmetrical voltages. If the phase voltages at the primary side are asymmetrical in the case of a multiphase transformer, this asymmetry can be corrected by controlling the switching device according to the invention differently for the separate phases and independently of the other phases;

remote control. Normally speaking, the regulation of the transformer turns ratio takes place by generating a control signal in a closed-loop control system, the reference for a voltage to be regulated being generated internally. Such a voltage reference can, however, also be generated externally and remotely fed to the switching device;

parallel connection of transformers. Voltage differences between parallel-connected transformers can be eliminated with the aid of a suitable control. A master/slave control can, for example, be used for this purpose, a master control system controlling the voltage of a transformer and generating a current adjustment for a slave control system of another transformer.

Preferably, the control device of the switching device is adapted to switch on the first and second tap with the aid of pulse-width modulation.

For this purpose, the switches each advantageously comprise a parallel circuit of two transistors connected in series opposition and two diodes connected in series opposition, the connection point between the diodes being connected to the connection point between the transistors. In a practical embodiment, the said connecting point is connected to the emitters of the transistors and to the anodes of the diodes, and the transistors are of the IGBT type.

In another preferred embodiment, the control device of the switching device is adapted for switching between the first and second tap with the aid of phase control, in which case the switches may comprise thyristors connected in antiparallel fashion with natural commutation.

In a preferred embodiment, the device according to the invention comprises at least one element which ensures that the voltage across, and the current through, the electronic switches do not exceed a certain limit value, so that the electronic switches have to be suitable only for rated voltages and currents. Such an element can, on the one hand, be designed with a first terminal which is adapted to be connected to a tap of the regulating winding of the transformer and with a second terminal which is adapted to be connected to the first or the second terminal of a switch. On the other hand, such an element can be designed with a first terminal which is adapted to be connected to the first terminal of a switch and with a second terminal which is adapted to be connected to the second terminal of a switch. Examples of the elements concerned are: an impedance, a thyristor, a voltage-dependent resistor and a surge voltage protector. In combination with a suitable control device, provision can be made that, in the event of short-circuiting of the transformer, the short-circuit current runs through the limiting element. The same may apply in the event of the transformer being switched on, under which circumstances currents occur which are a number of times higher than the rated current. Moreover, the switching device according to the invention can be fed by the power transformer itself, for example from the tap which is connected to the limiting element. In that case, the transformer is switched on via the element, after which the switching device is put into operation in the steady-state operating condition of the transformer, so that the switching device does not need a separate power supply.

The invention also relates to a transformer which is provided with at least one winding with taps and has a switching device as described above.

BRIEF DESCRIPTION OF THE DRAWINGS

The invention is explained below in greater detail by reference to the accompanying drawings, wherein:

FIG. 1 shows a diagram of a transformer, one winding of which is provided with four or five taps which are connected to a switching device according to the invention;

FIG. 2 shows an alternative for the electronic switch shown in FIG. 1;

FIG. 3 shows a diagram of another transformer which has a winding provided with taps;

In the various figures, the same reference numerals relate to the same components or components having the same function.

Figure 4:
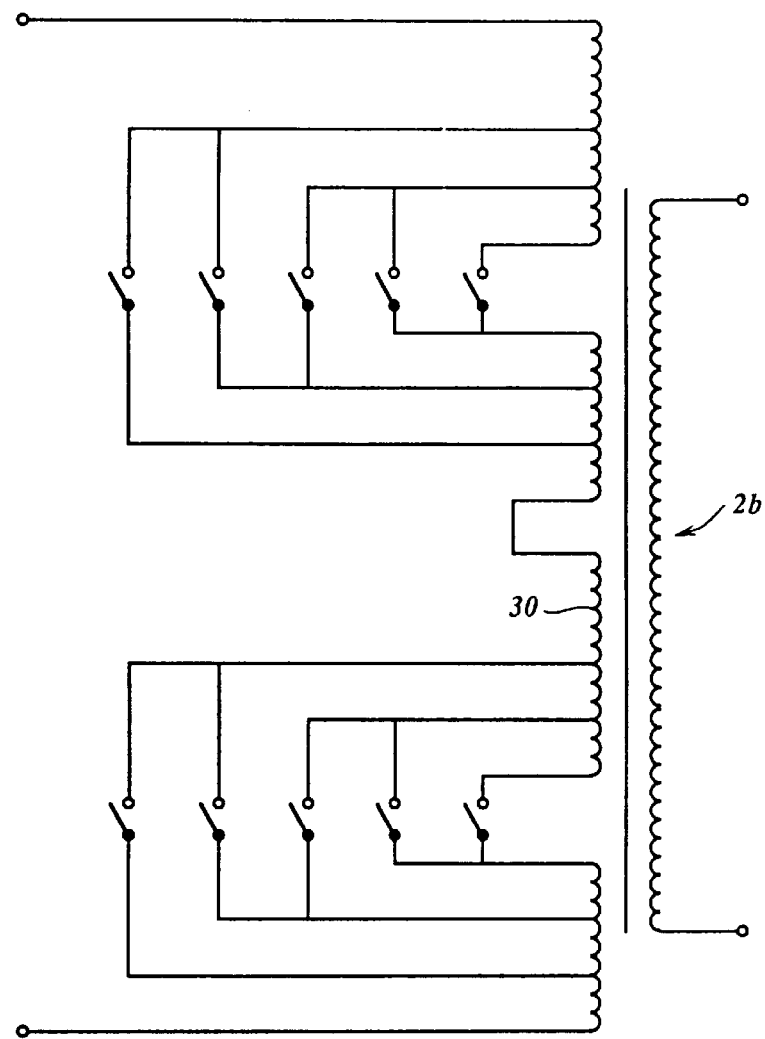
FIG. 4 shows yet another transformer which has a winding provided with taps for increasing the in-phase regulating range of the transformer.

The description below always assumes a single-phase transformer representation; it will be clear that, in the case of a multiphase transformer, the circuit described and shown will be present in plurality in accordance with the number of phases.

DETAILED DESCRIPTION

FIG. 1 shows a phase of a transformer 2 which comprises a primary winding 4 and a secondary winding 6. It may, for example, be a 400 kVA transformer having a rated primary voltage of 10.5 kV and a secondary voltage of 420 V. The primary winding 4 is provided with taps 6a, 6b, 6c and 6d, which are each connected to a first terminal of a pair of thyristors 8a and 10a, 8b and 10b, 8c and 10c or 8d and 10d, respectively, which are connected in anti-parallel. The other (second) terminals of the pairs of thyristors connected in anti-parallel are mutually interconnected and lead to a terminal 12 of the network. Each pair of thyristors connected in anti-parallel and surrounded by a chain-dot line is individually controlled (symbolically indicated by arrows 13a–13d) with the aid of a control device 14, not described here in greater detail, on the basis of a transformer turns-ratio control signal $U_{ref}$ fed to the control device 14. Operation of the control device will be described in greater detail below by reference to FIGS. 6 to 11, inclusive.

The pairs of thyristors connected in anti-parallel according to FIG. 1 operate on the basis of natural commutation and are therefore particularly suited to phase control. In the case of pulse-width modulation, a forced commutation has to be possible, for which purpose GTO (Gate Turn-Off) elements, for example, can be used. In the last mentioned case, it is also possible to use the parallel circuit, shown in FIG. 2, of transistors 16 and 18 connected in series opposition and diodes 20 and 22 connected in series opposition, the connection point between the transistors 16 and 18 and the connection point between the diodes 20 and 22 being interconnected.

In FIG. 1, that portion of the winding which is provided with taps is situated at one end of the primary winding 4. In FIG. 3, that portion of a winding 4a of a transformer 2a which is provided with taps is, however, situated more centrally in the winding. The switches shown in FIG. 3 et seq., such as the switches 24a, 24b, 24c and 24d, are shown in very simplified form for the sake of simplicity but comprise, in a real design, controllable semiconductor elements, such as the thyristors in the circuit according to FIG. 1 or the transistors and diodes in the circuit according to FIG. 2. Again no control devices are shown in FIG. 3 et seq. for the sake of clarity.

In both FIG. 1 and FIG. 3, a tap 6e or 6f, respectively, is shown by dashed lines and is connected to an element 26 or 28, respectively, whose other side (element 26) is connected to the terminal 12 or whose other side (element 28) is connected to the first terminal of the switch 24a, and which element serves to reduce the electrical voltage loading and current loading of the electronic switches, for example while the transformer is being switched on and during short circuits. In such situations, high to very high currents flow which can flow via the element 26 or 28, respectively, as a result of the opening of the switches. The voltage loading of the switches remains sufficiently low due to the element.

An element 26 or 28 may also be connected in parallel with a switch as indicated in FIG. 1 and FIG. 3. For protecting the switch 24a shown in FIG. 3, the connection shown by a dashed line between the element 28 and tap 6f in that case is replaced by a connection as shown by a dash—dot line.

The switches are only in operation during the normal steady-state condition of the transformer 2 or 2a, respectively, and not during the switching-on or short-circuiting of the transformer. This means that the electrical power supply for the control device for the switches can be obtained from the transformer itself since power is needed only if the transformer is in operation.

The transformer according to FIG. 4 has a primary winding 30 which in fact comprises a series circuit of the windings ea according to FIG. 3 for increasing the voltage in-phase regulating range.

Figure 5:
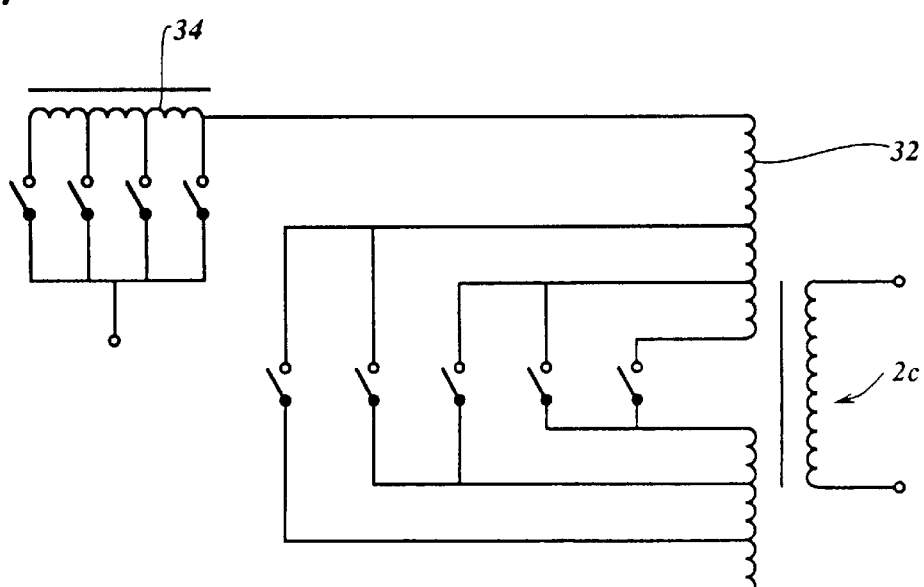
FIG. 5 shows yet another transformer which has windings provided with taps in two different phases for in-phase and quadrature regulation of a three-phase transformer.

In the transformer circuits according to FIGS. 1, 3 and 4, there is always a so-called in-phase regulation, i.e. a voltage regulation in one phase. A combination of an in-phase and a quadrature regulation, i.e. a simultaneous regulation of windings on different transformer cores is diagrammatically shown in FIG. 5. Transformer 2c according to FIG. 5 has a regulating winding 32 of a first phase which is connected in series with a regulating winding 34 of another phase.

Figure 6:
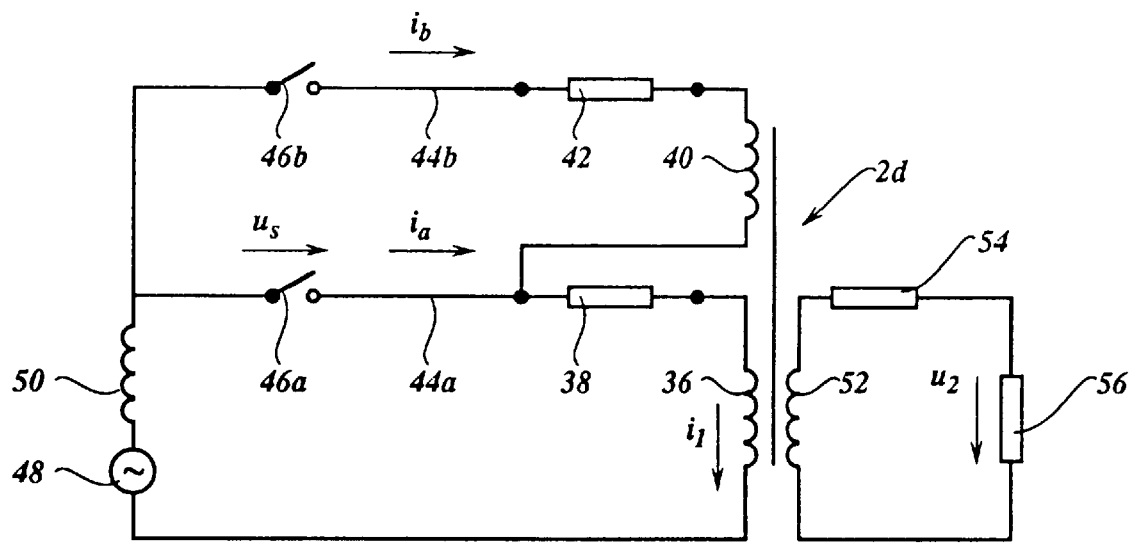
FIG. 6 shows a very simplified equivalent diagram of a transformer incorporated in a network.
Figure 7:
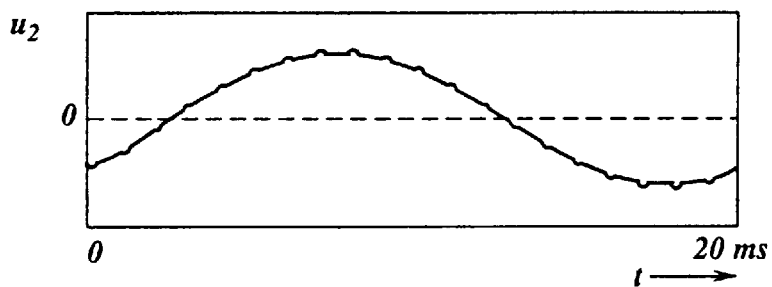
FIG. 7 shows the transformer output voltage in the case of pulse-width modulation according to FIG. 8 in the diagram of FIG. 6.

FIG. 6 shows a transformer 2d having a primary main winding 36 which has a resistance 38 and a primary winding section 40 which has a resistance 42. The primary winding 36, 40 has taps 44a and 44b which are connected to one side of the switches 46a and 46b, respectively. The other sides of the switches 46a, 46b are interconnected and connected to the supply side of a network which is indicated in symbolic form by a voltage source 48 and an inductance 50.

The secondary winding 52, which has a resistance 54, is connected to a load impedance 56, across which there is the output voltage $u_2$. The voltage across the switch 46a is shown as $u_5$.

Figure 8:
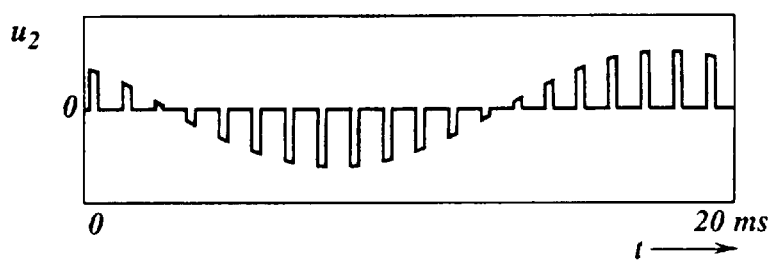
FIG. 8 shows the associated voltage across a switch in FIG. 6.

In pulse-width modulation, the switch 46b is closed starting from the opened position—and switch 46a is opened starting from the closed position—in a rhythm which can in principle be derived from FIG. 8. According to FIG. 8, the switch-on time is three to four times as great as the time during which the switch 46a is opened. In the case shown, the frequency of the pulse-width modulation (1 kHz) is twenty times as high as the frequency (50 Hz) of the voltage to be modulated. It is clearly observable in the output voltage $u_2$ of the transformer 2d according to FIG. 7 that the voltage while switch 46a is opened (corresponding to the time period during which switch 46b is closed) is higher than during the remaining time, as a result of which the rms value of the voltage $u_2$ is between a value which is obtained if switch 46a is permanently closed and a value which is obtained if switch 46b is permanently closed. It will be clear that the voltage $u_2$ can be continuously varied by continuously varying the pulse width.

Figure 9:
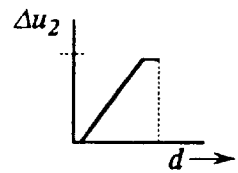
FIG. 9 illustrates a regulation characteristic in the case of pulse-width modulation.

If the switch-on factor d is defined as the ratio of the time during which switch 46b is closed to the switching time of the pulse-width modulation, there is a relationship between the variation in the transformer output voltage $\Delta u_2$ and the switch-on factor d as shown in FIG. 9. The curve obtained is nonlinear, which is the consequence of the fact that the electronic switches used are not ideal.

Figure 10:
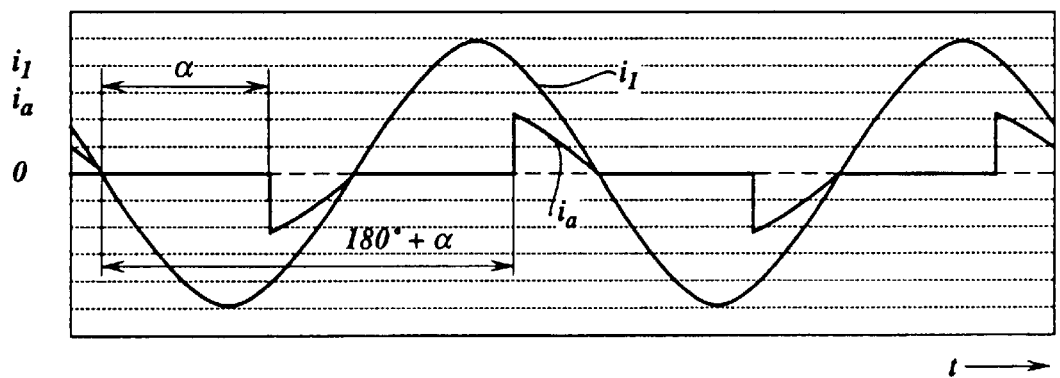
FIG. 10 illustrates the current in the non-tapped part of the primary winding of the transformer according to FIG. 6 and the current through a tap of said transformer in the case of phase control.
Figure 11:
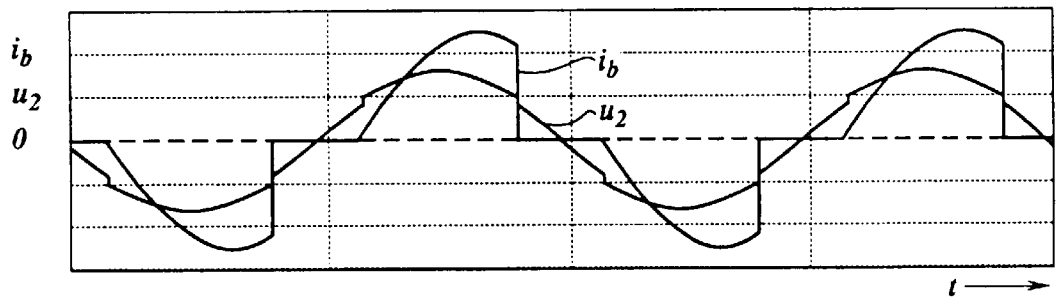
FIG. 11 illustrates the voltage on the secondary side and the current through another tap of the transformer according to FIG. 6 in the case of phase control.

For the purpose of FIGS. 10 and 11 it has been assumed that the switches 46a and 46b in the circuit according to FIG. 6 are formed by thyristors connected in anti-parallel, the switch 46a being closed (and switch 46b being opened) at instants in time which correspond to phase angles $\alpha$ and $180°+\alpha$. In FIGS. 10 and 11, two cycles of current $i_l$ through the non-tapped portion of the primary winding of the transformer 2d according to FIG. 6 are shown on arbitrary vertical scales, and also two cycles of current $i_a$ through switch 46a, current $i_b$ through the switch 46b, and the secondary voltage $u_2$. It is clearly evident from FIG. 10 that at the instants in time which correspond to phase angles $\alpha$ and $180°+\alpha$, the output voltage $u_2$ decreases in steps and again increases stepwise after the zero-crossing of current $i_a$ through the tap which is connected to the switch 46a because, at that instant in time, switch 46a is opened and switch 46b is closed. It should be pointed out that for the sake of clarity, the stepwise alterations in the output voltage $u_2$ are shown in a more pronounced form than they would be in reality on the scale shown. The rms value of the output voltage $u_2$ can be adjusted continuously within a certain adjustment range by changing the phase angle $\alpha$.

Finally, it should be pointed out that it is not necessary in the method and device according to the invention always to operate switches of two adjacent taps. The switching device can also be designed to switch between the nth and the mth taps, where n and m are positive natural numbers, the absolute difference between which is greater than 1. Such management may be necessary, for example, if one of the switches of the switching device or the control thereof has become defective, with the result that the defective switch is continuously in the open state, while the transformer has nevertheless to be kept in operation. A desired voltage may in that case be adjusted, for example, by switching between the next higher and next lower tap.

We claim:

1. A method for adjusting, within a predetermined adjustment range, the turns ratio between a primary and a secondary winding of an AC power transformer comprising the steps of:

providing at least a portion of said primary winding with a plurality of taps;

switching AC voltage to a first one of said taps during a first time period of a cycle of the alternating voltage; and alternately switching AC voltage to a second one of said taps during a second time period of a cycle of the alternating voltage applied to the transformer to enable a transformer turns ratio that is essentially continuously adjustable within said preset adjustment range.

2. The method of claim 1 further comprising the step of using pulse-width modulation controlled switches to alternately switch said AC voltage between said first and second ones of said taps.

3. The method of claim 2 further comprising the step of switching said pulse-width modulation controlled switches at a frequency which is at least an order of magnitude higher than the frequency of the AC voltage.

4. The method of claim 1 wherein the step of switching said AC voltage between said first one of said taps and said second one of said taps is accomplished with the use of phase control.

5. The method of claim 1 further comprising the step of switching said AC voltage between said first one of said taps and said second one of said taps only when the transformer is essentially in its steady-state operating condition.

6. A switching device for adjusting, within a predetermined adjustment range, the turns ratio between a primary and a secondary winding of an AC power transformer having at least first and second taps on at least a portion of the primary winding of said transformer, the switching device comprising:

at least first and second electronic switches that can be made to conduct unidirectionally or bidirectionally;

a first terminal on each of said switches adapted to be coupled to one of said first and second taps;

a second terminal on each of said switches adapted to be connected to one of the first and second terminals of at least one other of said electronic switches;

a control device coupled to said at least first and second electronic switches for supplying control signals to said switches to obtain a transformer turns ratio that is essentially continuously adjustable within said predetermined adjustment range;

a reference signal coupled to said control device;

a first control signal generated by said control device for causing said first electronic switch to couple an AC voltage to said first tap during a first time period of a cycle of the AC voltage;

a second control signal generated by said control device for causing said second electronic switch to couple said AC voltage to said second tap during another time period of the cycle of the AC voltage; and the ratio of the time periods in which the first and second taps are switched being dependent upon said reference signal coupled to said control device.

7. The switching device of claim 6 wherein said control device generates pulse-width modulation signals to cause said electronic switches to switch said AC voltage from said first tap to said second tap.

8. The switching device of claim 6 wherein each of said first and second electronic switches comprises:

two transistors connected to each other at a first point in series opposition;

two diodes connected to each other at a second point in series opposition with an opposite polarity with respect to, and in parallel with, said two series connected transistors; and said first point and said second point being conductively coupled.

9. The switching device of claim 8 wherein said transistors are of the IGBT type.

10. The switching device of claim 6 wherein said control device generates phase control signals to cause said electronic switches to switch said AC voltage from said first tap to said second tap.

11. The switching device of claim 10 wherein said first and second electronic switches comprise thyristors coupled in anti-parallel relationship.

12. The switching device of claim 6 further comprising:
at least one element for limiting the voltage across, and the current through, the electronic switches such that a predetermined voltage or current value, respectively, is not exceeded;
a first terminal on said at least one element being adapted to be connected to one of said taps on said transformer; and
a second terminal on said at least one element being adapted to be connected to one of the first and second terminals of at least one of said electronic switches.

13. The switching device of claim 12 wherein said at least one element is formed by any one of the group comprising an impedance, a thyristor, a voltage-dependent resistor, and a surge voltage protector.

14. The switching device of claim 6 further comprising:
at least one element for limiting the voltage across, and the current through, the electronic switches such that a predetermined voltage or current value, respectively, is not exceeded;
a first terminal on said at least one element being connected to said first terminal of at least one of said electronic switches; and
a second terminal on said at least one element being connected to at least one of said first and second terminals of at least one of said electronic switches.

15. The switching device of claim 14 wherein said at least one element is formed by any one of the group comprising an impedance, a thyristor, a voltage-dependent resistor, and a surge voltage protector.

16. The switching device of claim 6 wherein said switching device receives power from said AC power transformer.

17. An AC power transformer comprising:
at least one regulating winding having a plurality of taps thereon;
a primary and a secondary winding;
a switching device for adjusting, within a predetermined adjustment range, the turns ratio of the primary and secondary windings of the power transformer;
said switching device comprising a plurality of electronic switches, each having the capability of conducting unidirectionally or bidirectionally;
a first and a second terminal on each of said electronic switches;
said first terminal of each of said electronic switches being connected to a corresponding one of said plurality of taps on said regulating winding;
said second terminal of each of said electronic switches being connected to one of said first and second terminals of at least one other of said electronic switches;
a control device for supplying control signals to said electronic switches so as to obtain a transformer turns ratio that is essentially continuously adjustable within said adjustment range;
a reference signal coupled to said control device;
a first control signal generated by said control device for coupling an AC voltage to one of said taps during a first time period of a cycle of the AC voltage; and
a second control signal generated by said control device for coupling said AC voltage to a different tap during a second time period of said cycle of the AC voltage;
the ratio of said first and second time periods being dependent upon said reference signal fed to said control device.

* * * * *